Oct. 23, 1928.

J. H. W. GILL 1,688,808

AXIAL FLOW HYDRAULIC MACHINE

Filed Oct. 14, 1926     6 Sheets-Sheet 1

INVENTOR
By James H. W. Gill,
Watson, Coit, Morse & Grindle
ATTYS.

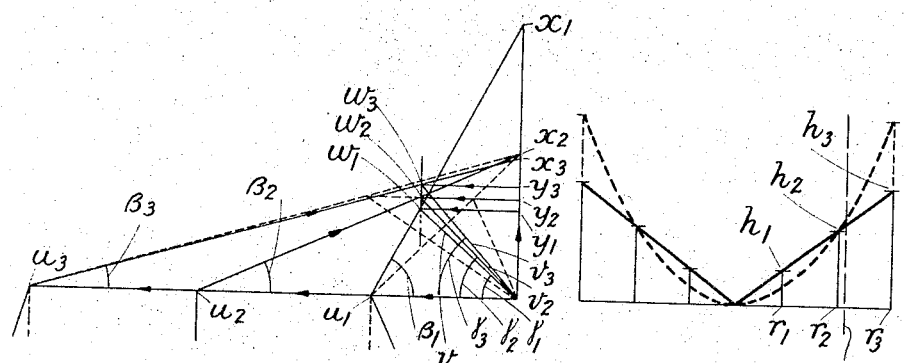
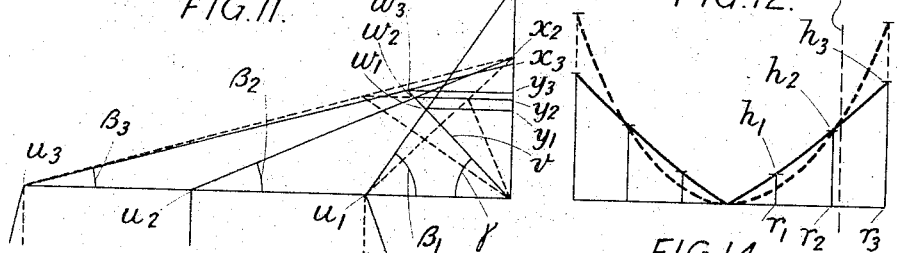
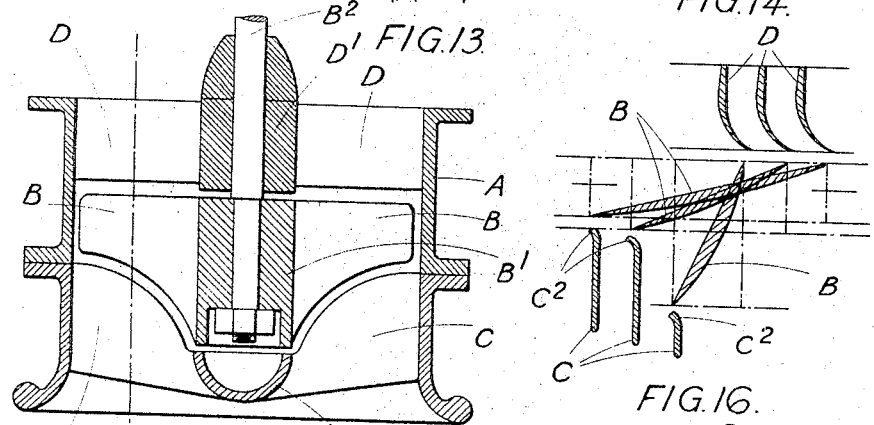
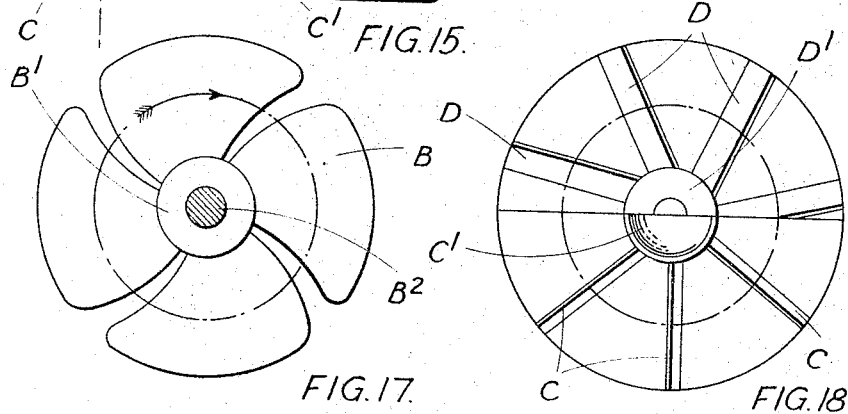

Oct. 23, 1928.

J. H. W. GILL 1,688,808

AXIAL FLOW HYDRAULIC MACHINE

Filed Oct. 14, 1926    6 Sheets-Sheet 3

INVENTOR
By James H. W. Gill,
Watson, Coit, Morse & Grindle
ATTYS

Oct. 23, 1928.

J. H. W. GILL 1,688,808

AXIAL FLOW HYDRAULIC MACHINE

Filed Oct. 14, 1926 6 Sheets-Sheet 4

Oct. 23, 1928.
J. H. W. GILL
1,688,808
AXIAL FLOW HYDRAULIC MACHINE
Filed Oct. 14, 1926     6 Sheets-Sheet 5
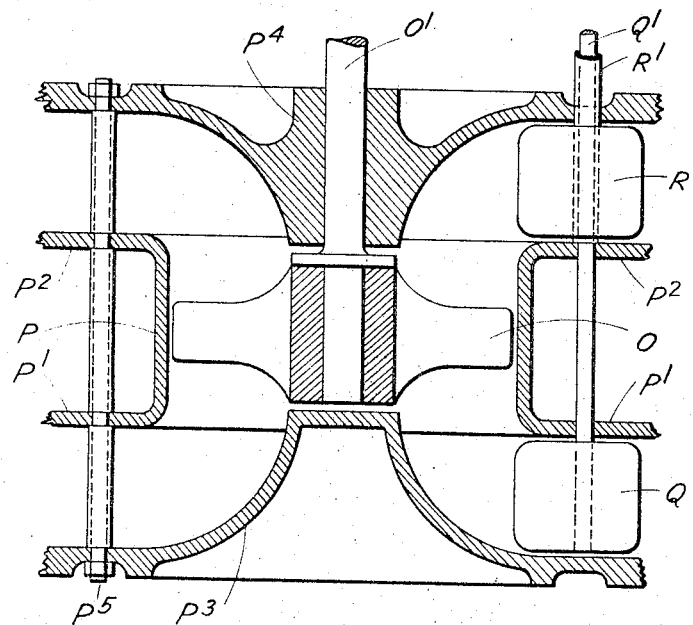
FIG. 24.
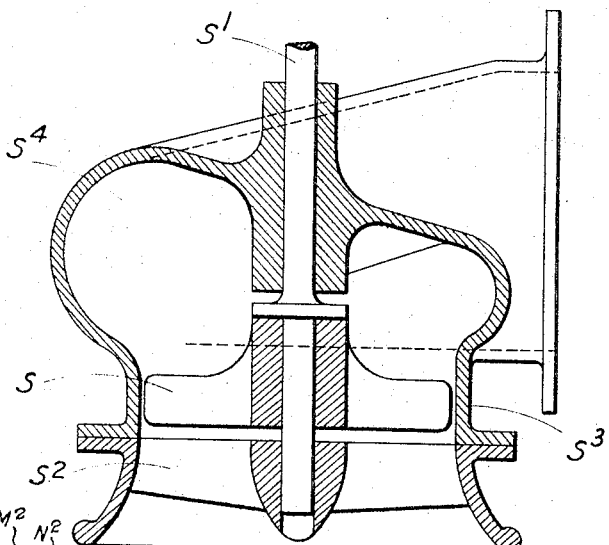
FIG. 33.
FIG. 25.
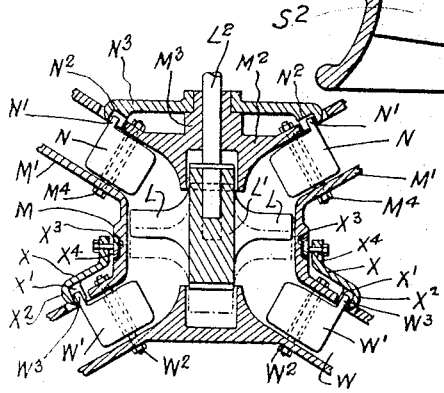
INVENTOR
By James H. W. Gill,
Watson, Coit, Morse & Grindle.
ATTYS

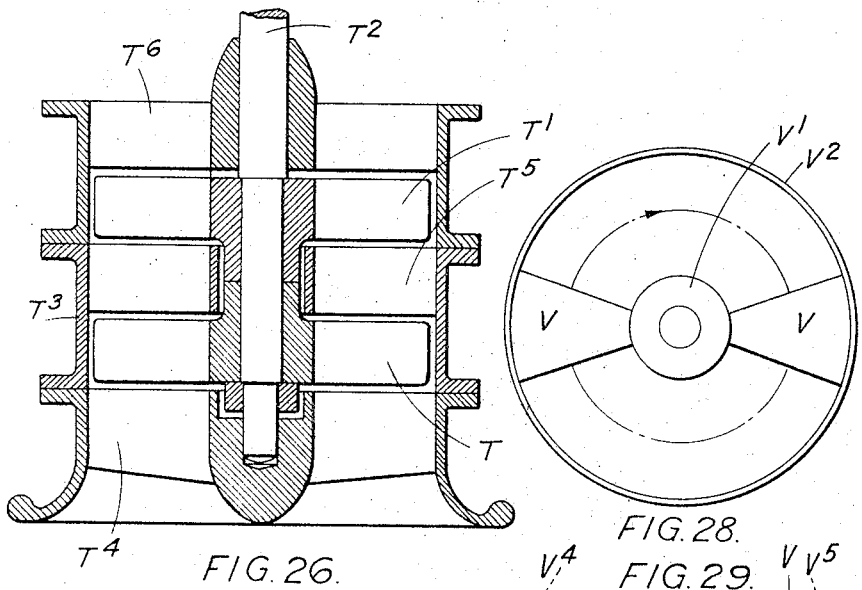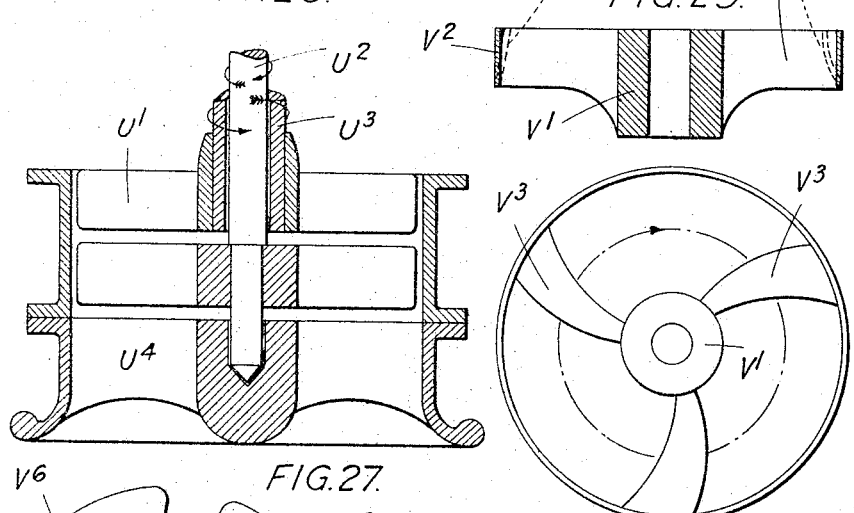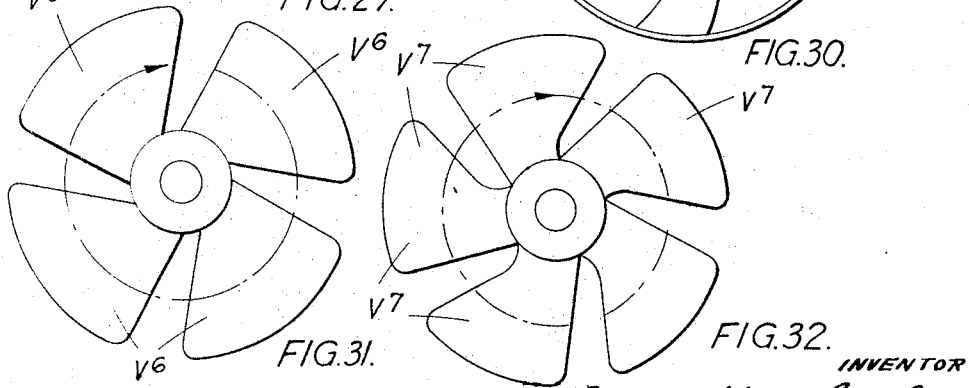

Patented Oct. 23, 1928.

1,688,808

UNITED STATES PATENT OFFICE.

JAMES HERBERT WAINWRIGHT GILL, OF HEACHAM, ENGLAND.

AXIAL-FLOW HYDRAULIC MACHINE.

Application filed October 14, 1926, Serial No. 141,639, and in Great Britain December 24, 1925.

This invention relates to pumps, reaction turbines or other hydraulic machines of the screw rotor type, in which the general direction of fluid flow at the rotor is or becomes substantially parallel to the axis thereof. In order to be effective in practice as a pump or turbine, such a machine usually requires suitable guide vanes on one or both sides of the rotor, also a casing shaped to promote efficient conditions of flow.

In an axial flow screw pump the forced revolution of the rotor produces in the fluid acted upon a spiral flow which can be resolved into flow in an axial direction and whirl in a circumferential direction. Generally speaking, neglecting the various losses due to friction, eddy production and leakage, and the small gain due to recoverable kinetic energy of axial flow, it may be said that whilst the axial flow component is responsible for the quantity of fluid dealt with, the whirl component is a factor in the expression for pressure or head. It can be shown theoretically that the head generated at any radius of the rotor disc is proportional to the product of the whirl and the circumferential speed of the rotor at that radius, or in other words proportional to the product of the radius and the whirl at that radius for constant revolution speed of the rotor.

With an axial flow screw turbine the inverse general conditions obtain, for here whirl imparted to the fluid which is energized by a difference of head is an important factor in the torque which is developed at the rotor whilst the volume of fluid necessary to the power requirements must be accommodated in the speed of axial flow.

In both pumps and turbines of the axial flow type, guide vanes at the inlet side of the rotor are usually necessary, the function of these guides vanes being to prevent the occurrence of wasteful prewhirl in the case of the pumps and to impose useful prewhirl in the case of the turbines, though it is occasionally convenient to impose prewhirl for a turbine by means of a spiral whirl chamber. Guide vanes at the outlet side of the rotor are usually necessary in the pumps though they may occasionally be replaced by a whirl chamber. Guide vanes at the outlet side of the rotor are seldom necessary in the turbines though they may be employed to meet certain conditions.

The primary object of the invention is to provide a simple construction of axial flow hydraulic machine wherein the most effective practical combinations of whirl and axial flow are made use of under the conditions of working.

For an axial flow pump whose rotor blades conform to a normal true screw or helix of uniform pitch, theory indicates that both the flow in an axial direction and the slip are uniform at all radii of the rotor disc, whilst the discharge whirl varies directly as the radius and the head generated varies directly as the square of the radius. The "head curve" is thus a parabola and the surface showing the distribution of head over the rotor disc is that of a paraboloid of revolution. There is consequently a great difference between the head generated near the axis of the rotor and that generated near its periphery, and this steep head gradient involves a tendency to back-flow towards the centre of the rotor disc. This defect has led to the common use of relatively large boss diameters, with the object of reducing the total head gradient and obtaining more favourable hydrodynamic conditions by cutting out the lower range of head values.

Looked at from the point of view of head distribution alone, the ideal condition would be a uniform head at all radii, but in practice this involves abnormal conditions of flow and awkward distributions of pitch in the rotor blades, unless very large boss diameters be retained. Numerous suggestions have been made which result in approximating to uniform distribution of head; among these may be mentioned designs in which the whirl velocity is made to vary inversely as the radius, to the end that each element of fluid may develop equal torque energy at the rotor. For a given mean pitch and diameter of rotor and of boss, such designs involve the defect that an unduly large proportion of the pumping head has to be generated at a short radius, which involves either an increase in mean pitch or an increase in revolution speed, as compared with a true screw rotor of equal size for the same power input. An increase in mean pitch aggravates the excessive pitch towards the roots of the rotor blades, whilst an increase in revolution speed causes an increase in the frictional losses. Another objection in the case of a screw pump is that the outlet guide vanes as well as the rotor blades tend to assume complicated forms in their distribution of pitch.

A further object of the present invention is therefore so to arrange the details of the machine as to produce the most favourable practical compromise in the distribution of head, combined with a simple and strong design of rotor developing the highest specific speeds consistent with the avoidance of undesirable frictional losses, whilst the guide vanes are of simple constructional form.

In the axial flow hydraulic machine according to this invention, wherein the rotor may be employed alone or in combination with guide vanes on one or on both sides thereof, the rotor blades or the guide vanes or both are so shaped that the linear velocity of whirl imparted to the fluid flowing through the rotor is approximately the same at all radii.

It is to be understood that the phrase "impart whirl to" is to be taken to include imparting an additional whirl to a fluid stream which already has whirl either in the same or in the opposite direction. Thus, for example, if the fluid stream already has a constant whirl in one direction, imparting a similar constant whirl in the opposite direction will be equivalent to abstracting all whirl from the fluid.

Although the constant whirl effect according to the invention may be obtained partly or wholly by shaping the guide vanes, it is preferred to obtain this effect solely by a suitable distribution of pitch in the rotor blades, whether the rotor be used in conjunction with guide vanes or not.

The word "approximately" in the above definition must be interpreted in a broad sense so as to indicate more than slight constructional variations from the constant whirl condition. Thus the whirl velocity may differ at different radii, and the divergence from the average whirl velocity may in certain cases amount to as much as 25%.

A mathematical analysis will show more clearly the nature of the permissible variation from a theoretical condition of constant whirl.

If $h$ represents the head generated at discharge from the rotor at a point distant $r$ from the axis, and $c_0, c_1, c_2 \ldots$ are constants, the mathematical equation for the head generated by a true screw rotor is $h = c_2 r^2$, whilst that for a rotor satisfying the constant whirl condition is $h = c_1 r$ and that for a rotor designed in accordance with the theoretically ideal distribution of head is $h = c_0$, in each case assuming uniform velocity of axial flow at inlet to the rotor. These are the equations of the "head curves" and the "head surfaces" which show the distributions of head over the rotor discs are obtained by rotating these curves about the axis of the rotor. The phrase "head diagram" will be used to indicate the area under the head curve, i. e. the area cut off between the head curve and the axis of reference (from which the head ordinates are measured) by ordinates at abscissæ $pR$ and $R$, where $R$ is the maximum radius of the rotor disc and $pR$ is the radius of the boss. If $k$ be the "head radius", i. e. the radial distance of the centre of gravity of the head diagram from the rotor axis (suffixes being employed for special values of $k$), it can be shown that for the true screw rotor $$k_2 = \tfrac{3}{4} R \cdot \frac{1-p^4}{1-p^3},$$

whilst for the constant whirl rotor $$k_1 = \tfrac{2}{3} R \cdot \frac{1-p^3}{1-p^2},$$

and for the constant head rotor $$k_0 = \tfrac{1}{2} R \cdot \frac{1-p^2}{1-p} = \tfrac{1}{2} R(1+p).$$

The general expression for the head radius K (assuming the axial flow velocity to be uniform at all radii) can be shown to be $$\frac{\int_{pR}^{R} \frac{r^3 (P-C)}{P} dr}{\int_{pR}^{R} \frac{r^2 (P-C)}{P} dr}$$

where P is the pitch at radius $r$ and C is a constant.

A satisfactory distribution of head according to the present invention can be obtained from all rotor arrangements in which the head radius has a value differing from $k_1$ by less than $0.075 R(1-p)^2$.

The following may be instanced as an illustration of this definition of the permissible limits of variation from constant whirl conditions. The equation $h = C_n r^n$ represents a family of head curves, of which the three head curves mentioned above are particular members. The head radius $k_n$ for a general member of this family of curves is given by $$k_n = \frac{n+1}{n+2} R \cdot \frac{1-p^{n+2}}{1-p^{n+1}}.$$

It will be found that the upper and lower limiting values of the head radius mentioned above are obtained respectively when $n$ has values slightly greater than 1.5 and slightly less than 0.5. Thus all rotor arrangements, for which the head curves are given by $h = C_n r^n$ where $n$ lies between 0.5 and 1.5, are included within the above definition of the permissible limits of variation from constant whirl conditions. It will be appreciated that many other rotor arrangements, for which the head curves are of totally different mathematical form, will also give a satisfactory distribution of head, provided that their head radii lie within the limits specified.

These considerations will be rendered clearer by a comparison of the diagrams shown in the first fourteen figures of the accompanying drawings. In these drawings, Figures 1 and 2 respectively show a velocity diagram and a head curve for a true screw rotor, Figures 3 and 4 are similar diagrams for a constant head rotor, Figures 5 and 6 are similar diagrams for a constant whirl rotor according to the invention, and Figures 7 and 8, Figures 9 and 10, Figures 11 and 12 and Figures 13 and 14 are similar diagrams for four other rotor arrangements according to the invention.

Figure 15 is a vertical section on an axial plane through a simple form of pump;

Figure 16 is a diagram showing cylindrical sections at three radii, $16^a$, $16^b$ and $16^c$, through the rotor blades and the inlet and outlet guide vanes;

Figure 17 is a plan of the pump rotor;

Figure 18 is in its upper half a plan of the outlet guide vanes and in its lower half a plan of the inlet guide vanes;

Figure 24 illustrates a further modification designed to accommodate flow in either direction through the rotor;

Figure 25 shows a construction employing a volute chamber;

Figure 26 illustrates a construction employing two rotors on the same shaft;

Figure 27 shows a construction employing two oppositely rotating rotors;

Figures 28–32 illustrate various alternative forms of rotor, Figure 29 being an axial section through the rotor of Figure 28; and Figure 33 shows a modification of the arrangement shown in Fig. 24.

In these comparative diagrams the following nomenclature is used:—

$r$ = radial distance from rotor axis.
$u$ = circumferential velocity of rotor.
$v$ = absolute flow velocity.
$w$ = whirl velocity.
$x$ = theoretical axial velocity.
$y$ = actual axial flow velocity.
$h$ = head.
$\beta$ = relative flow angle.
$\gamma$ = outlet guide vane angle.

In all diagrams three radii $r_1$ $r_2$ $r_3$ are taken and suffixes are added to each of the other elements to indicate the radius to which they correspond, the radius $r_2$ being midway between the radii $r_1$ and $r_3$. These diagrams are described with reference to the use of the rotor in a pump, but the application to a turbine will be readily obtained by a simple inversion, so that for instance $\gamma$ becomes the inlet guide vane angle.

With any rotor the rotation of the blades at revolution speed $n$ would, if there were no slip, impart to a particle of fluid at distance $r$ from the axis an axial velocity $x$ (equal to the product of the revolution speed and the pitch). In practice, however, there must be slip (denoted by $s$), with the result that the actual fluid flow has components $y$ (less than $x$ by an amount $xs$) in an axial direction and $w$ in a circumferential direction, these quantities being connected together by the equations $$\frac{x}{u} = \frac{x-y}{w} = \tan \beta,$$

and $$s = \frac{x-y}{x} = \frac{w}{u}.$$

The head $h$ generated at radius $r$ is proportional to $wu$ and therefore also to $u^2s$. The pitch at radius $r$ is equal to $\frac{x}{n}$ and is therefore proportional to $$\frac{r}{r - \frac{w}{2\pi n}}.$$

It is usual to design a rotor to suit certain specified working conditions, and (except where otherwise stated) the diagrams show only the results obtained when the rotor is operating at the conditions for which it was designed. Under these conditions the relative flow angle $\beta$ is the actual blade angle, and the theoretical axial velocity $x$ is equal to the product of revolution speed and pitch. When, however, the rotor is operating under conditions other than those for which it was designed, the relative flow angle $\beta$ is no longer the actual blade angle, and the theoretical axial velocity $x$ is now equal to the product of the revolution speed and the virtual pitch. These circumstances will be more fully discussed with reference to the constant whirl rotor of Figures 5 and 6.

Figure 1:
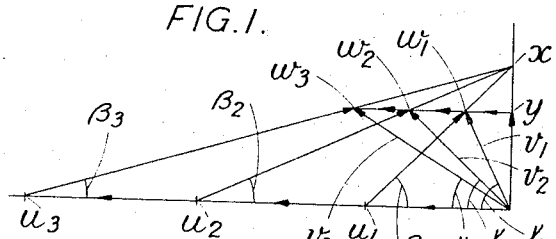
Figure 2:
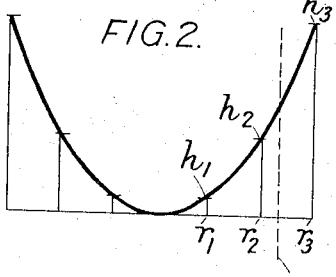

Figures 1 and 2 relate to a true screw rotor with uniform pitch at all radii. It will be noticed that the axial flow velocity $y$ and the slip $\frac{x-y}{x}$ are uniform at all radii and that the whirl velocity $w$ varies directly as the radius. The head $h$ is therefore proportional to the square of the radius and the head curve is a parabola as shown in Figure 2.

Figure 3:
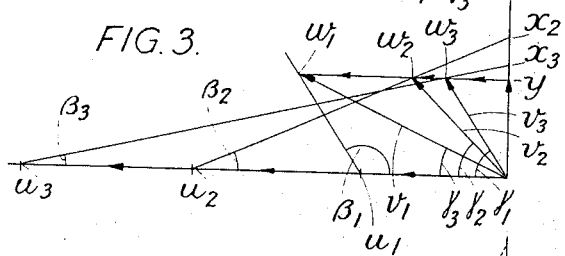
Figure 4:
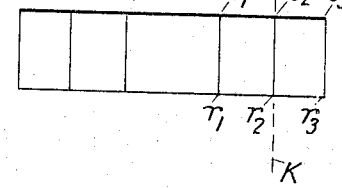

Figures 3 and 4 relate to a rotor designed for the theoretically ideal distribution of head. In this case the whirl velocity $w$ varies inversely as the radius and the head $h$ is the same at all radii. It will be noticed that the blade angle $\beta$, associated with the smallest of the three radii is in this instance obtuse. This serves to illustrate the statement previously made that (unless large boss diameters are used) the ideal condition of uniform head involves abnormal conditions of flow and awkward distributions of pitch in the rotor blades.

Figure 5:
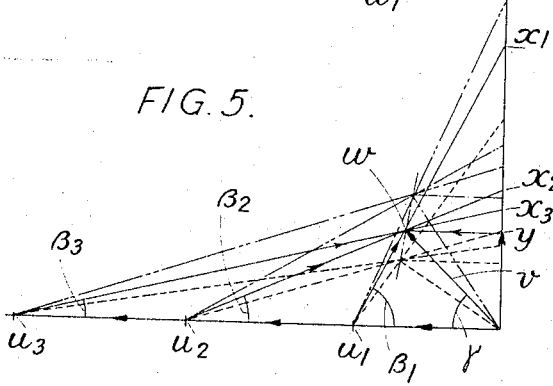
Figure 6:
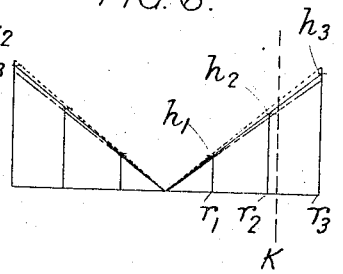
Figure 7:
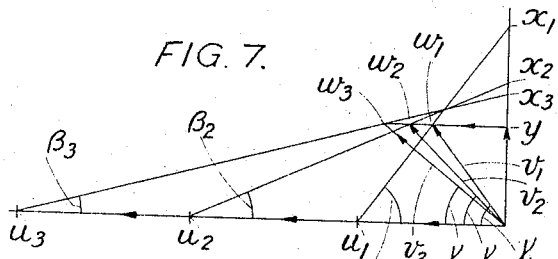
Figure 8:
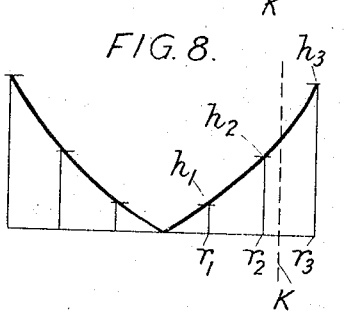
Figure 9:
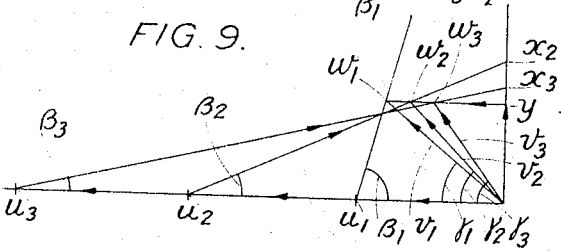
Figure 10:
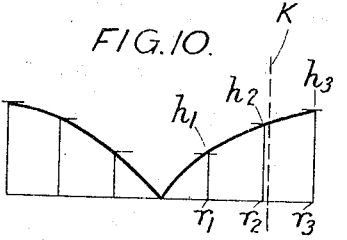

The velocity diagram and the head curve for the preferred form of rotor according to the invention are shown respectively in Figures 5 and 6. In this form the pitch of the rotor blades varies in a radial direction in such a manner as to impart to or receive from the fluid flowing through the rotor a substantially uniform velocity of whirl at all radii. Thus the pitch at radius $r$ is proportional to $\dfrac{r}{r-c}$ where $c$ is a constant. With this form of rotor, in a screw pump, the slip increases inwards towards the axis, whilst the head increases outwards towards the periphery so as to vary as the first power of the radius. The head curve thus consists of two straight lines equally inclined to the axis, and the surface showing the distribution of head over the rotor disc is that of an inverted cone generated by the rotation of the head curve about the axis. It will be seen that the head gradient, which when steep tends to produce back-flow towards the axis, is very much smaller than for a true-screw rotor. For example, if $r_1$ in Figures 2 and 6 be taken as the boss diameter and $r_3$ as the rotor diameter, the boss diameter then being 30% of the rotor diameter, the head gradient with the constant whirl rotor (Figure 6) is less than half the head gradient for the equivalent true screw rotor (Figure 2).

The description given in the preceding paragraph relates only to the results obtained when the rotor is operating under the working conditions for which it was designed, these results being shown in full lines in Figures 5 and 6. These figures also show in dotted line and chain line the results obtained under other working conditions. The chain lines illustrate the case when the head is decreased, with consequent decrease in whirl velocity and increase in axial flow velocity, the relative flow angle and the virtual pitch being greater than the blade angle and the actual pitch. The dotted lines illustrate the case when the head is increased, with consequent increase in whirl velocity and decrease in axial flow velocity, the relative flow angle and the virtual pitch being less than the blade angle and the actual pitch. It will be noticed that the whirl velocity is still constant at all radii in each case, as also is the absolute angle of outflow and the ratio between the head and the radius, but the values of these constants vary with varying working conditions.

Figures 7 and 8 and Figures 9 and 10 respectively show similar diagrams for two rotors which differ from the constant whirl rotor (Figures 5 and 6) to an extent approximately corresponding to the permissible limits above referred to. Both these rotors show a maximum divergence of about 25% from the constant whirl condition, the former (Figures 7 and 8) having a divergence towards true screw conditions, whilst the latter (Figures 9 and 10) diverges towards constant head conditions.

The head radii for these five rotors are indicated by the dotted lines marked $k$ in Figures 2, 4, 6, 8 and 10, the radius $r_3$ being taken as the maximum radius of the rotor disc, whilst the radius $r_1$ is taken as the radius of the boss. Thus using the notation of the mathematical analysis given above, $r_3 = R$ and $r_1 = pR$. In the drawings $r_1$ is shown as 30% of $r_3$, so that $p = 0.3$, and in this instance the ratio between the head radius $k$ and the maximum radius R has approximately the following values for the five rotors:—

For the true screw rotor (Figure 2) 0.765.
For the constant head rotor (Figure 4) 0.650.
For the constant whirl rotor (Figure 6) 0.713.
For the upper limit rotor (Figure 8) 0.750.
For the lower limit rotor (Figure 10) 0.676.

It should be pointed out that with the constant whirl rotor alone the "effective head radius," on which practical calculations are usually based, has the advantages of being equal to the "head radius." The "effective head radius" may be defined as that radius at which the actual head generated is equal to the "effective head," i. e. to the average of the heads generated at all points of the rotor disc, the effective head thus being obtained by dividing the volume swept out by the rotation of the head diagram by the area of the rotor disc. With the constant whirl rotor the effective head radius is theoretically only a little shorter than that for the true screw rotor (in the particular case illustrated in the diagrams about 3½% shorter), and the theoretical increase in revolution speed is therefore negligible. In actual practice, with a screw pump, it has been found that for the same head and quantity the revolution speed is slightly lower for a constant whirl rotor than for the equivalent true screw rotor, owing to gains in other directions.

The desired approximately constant whirl may be obtained either by suitable distribution of pitch and area in the rotor blades, or partly by this means and partly by the inclination of the inlet guide vanes. For a screw pump it is theoretically possible to secure constant whirl at discharge from the rotor, even with a true screw rotor (i. e. a rotor whose blades conform to a helix of constant pitch) of suitable axial length, by twisting the radial inlet guide vanes adjacent to the rotor, so as to produce a forced feed near the axis and a starved feed near the periphery. The velocity diagram and the head curve for such an arrangement are shown in full lines in Figures 11 and 12, (the results obtained with a true screw rotor with normal feed being shown dotted for purposes of comparison), and an indication is given below the velocity diagram in Figure 11 of the inclination of the inlet guide vanes. It will be noticed that the head curve (Figure 12) for this arrangement is identical with the head curve for the constant whirl rotor (Figure 6), but although equalizing the whirl, this arrangement would not be very satisfactory in practice on account of eddy losses and inequality of flow. For it will be seen that the axial flow velocity $y$ is greatest near the periphery and smallest near the axis, whilst the general tendency is for flow speeds to become uniform across a section transverse to the axis or even slightly greater near the axis than near the periphery. Moreover this arrangement has not the advantage possessed by the constant whirl rotor of giving a constant outflow angle.

A compromise between this arrangement and the preferred arrangement, in which the desired condition of constant whirl is obtained solely by the design of the rotor blades, may be of practical value in certain instances. In such a compromise the desired condition can be approximated partly by the pitch distribution of the rotor blades and partly by a twisting of the inlet guide vanes.

Figures 13 and 14 show respectively a velocity diagram and a head curve for another arrangement which may be useful in certain instances. In this example a true screw rotor is again employed and the inlet guide vanes are twisted so as to produce a forced feed near the axis and a starved feed near the periphery. The extent of twisting of the inlet vanes is however less than in the arrangement illustrated in Figures 11 and 12, and is made such that the absolute direction of outflow from the discharge side of the rotor is the same at all radii. It will be noticed that the whirl is no longer the same at all radii, but the variation from constant whirl conditions is (except under circumstances involving abnormally high slip ratios) yet such as to come within the limits specified. The head curve for this arrangement is shown in Figure 14 and the head radius indicated by the dotted line $k$ (with normal slip values) lies between those of the arrangements of Figures 6 and 8. This arrangement, although not having such high efficiency as the preferred arrangement of Figures 5 and 6, possesses (in common with the preferred arrangement) the important practical advantage that the outlet guide vanes when disposed adjacent to the rotor may have a constant inclination from root to tip. It will be appreciated that a uniform angle of absolute discharge from the rotor can also be obtained with forms of rotor other than the true screw rotor by twisting the inlet guide vanes in a manner suitable to the shape of the rotor blades. Thus the condition for a uniform angle of discharge from the rotor is that the whirl velocity $w$ is proportional to the axial flow velocity $y$ at all radii. Hence the pitch of the rotor blades at radius $r$ must be proportional to $\frac{ry}{r-cy}$ where $c$ is a constant, if a uniform angle of discharge is to be obtained.

As has been stated, the preferred arrangement is that in which the pitch of the rotor blades varies in a radial direction in such a manner as to impart to or receive from the fluid flowing through the rotor a substantially uniform velocity of whirl at all radii. In this form of rotor the distribution of pitch, combined with a projected area and distribution of blade surface as necessary to promote steady conditions of flow, is such as to render this type of rotor a much stronger mechanical unit than an equivalent true screw rotor. Moreover the employment of a constant whirl rotor has another very important advantage in screw pump construction, (briefly referred to in the preceding paragraph) for the reason that, with uniform velocity of axial flow the absolute direction and speed of outflow (represented by $\gamma$ and $v$ in Figure 5) from the rotor are constant at all radii. This enables the outlet guide vanes, when arranged adjacent to the rotor, to be of very simple construction, in that the inclination of their edges lying next to the rotor is now made uniform from root to tip.

The invention may be carried into practice in various ways but Figures 15–32 of the accompanying drawings illustrate by way of example some convenient constructions both of pumps and of turbines according thereto.

The simple form of axial flow pump shown in Figures 15–18 comprises a bladed rotor operating between two sets of guide vanes, which are disposed coaxially with and adjacent to the rotor, surrounded by a cylindrical casing A with a bell-mouth inlet. The blades B of the rotor are carried at their roots by a cylindrical boss $B^1$ of suitable diameter mounted on a driving shaft $B^2$. In the construction illustrated the rotor has four blades B each with sickle-shaped edges (see Figure 17) and is of open form, the tips of the blades lying close to the wall of the casing A. The inlet guide vanes C and the outlet guide vanes D are mounted in the pump casing A at their outer ends and in suitable bosses $C^1$ and $D^1$ at their inner ends, the outlet guide vane boss D¹ containing bearings for the rotor shaft B².

The rotor is of the constant whirl type, for which the conditions of flow have been described with reference to Figures 5 and 6. Figure 16 shows the cross-section of each rotor blade at the boss, at the mid-radius and at the tips, the three radii of the sections shown thus corresponding to the radii $r_1$ $r_2$ $r_3$ of Figure 6. The sections are indicated in Figs. 15 and 16 by the correspondingly numbered lines. It will be noticed that the sections of the working face of the blades are straight and are inclined at angles corresponding to $\beta_1$ $\beta_2$ $\beta_3$ of the diagram of Figure 5, whilst the backs of the blades are curved to give the necessary thickness and strength in the middle and yet to retain sharp blade edges. Thus the pitch of the blades, which is uniform in an axial direction at any given radius, decreases radially outward in such a manner as to impart to the fluid stream acted upon by the rotor a velocity of whirl at outflow which has the same linear value at all radii. The net cross-sectional area available for fluid flow between the blades is so proportioned that the axial component of flow is approximately constant at all radii. Under these conditions it will be clear from the description already given with reference to Figure 5 that the angle of absolute outflow from the rotor (i. e. the inclination of the path of each individual fluid particle to the transaxial plane of discharge from the rotor) is constant at all radii. The arrows in Figures 16 and 17 indicate the direction of rotation of the rotor.

The inlet guide vanes C (see particularly Figure 16 and the lower half of Figure 18) lie mainly in surfaces whose direction is axial, and their main function is to prevent excessive prewhirl from occuring and to guide the fluid evenly in an axial direction towards the rotor. The edges of the inlet vanes next to the rotor are, however, preferably curved slightly in the direction of rotation of the rotor (as shown at C² in Figure 16) in order to avoid eddying at inflow to the blades. These edges are also curved to conform to the varying axial length of the rotor (see Figures 15 and 16), this axial length being greater at the boss and decreasing radially outwards to accommodate the radial change in pitch of the blades. In the particular example illustrated there are seven inlet guide vanes and they are arranged with their upper edges (i. e. the edges next to the rotor) in radial planes.

Owing to the fact that the direction of absolute outflow from the rotor is uniform at all radii, the "pick-up" angle of the outlet guide vanes D is also uniform throughout the length of each vane. The outlet vanes D are curved so that the fluid leaving these vanes flows in an axial direction. These outlet vanes serve to convert the whirl into head or pressure energy without augmenting the axial flow velocity. In the example illustrated seven outlet vanes are provided and their lower edges are disposed in radial planes.

With this arrangement the rotor operates by its revolution to draw the fluid through the inlet guide vane space in an axial direction, and to impart to the fluid a whirl velocity of discharge which is constant at all radii, the axial velocity of flow being uniform. This axial velocity of flow determines the quantity of fluid dealt with by the pump and the whirl velocity is converted into head or pressure energy by the outlet guide vanes. The cross-sectional areas available for the fluid stream throughout the machine are such as to promote a minimum of disturbance in the conditions of stable axial flow.

In the foregoing description the rotor has been described as of the constant whirl type. It will be appreciated that results, which are nearly as satisfactory from the point of view of the distribution of head over the rotor disc, can also be obtained if the pitch distribution is such as will give only an approximation to constant whirl conditions. Thus the rotor may be intermediate in form between those described with reference to Figures 7 and 9. It should be remembered, however, that any considerable departure from the constant whirl condition (unless accompanied by a corresponding variation in the axial flow velocity resulting for example from twisting the inlet guide vanes in the manner indicated at the bottom of Figure 13) will result in a varying angle of absolute flow from the outlet side of the rotor and will consequently necessitate a more complicated shape for the outlet guide vanes.

It will be observed that, for the outlet guide vanes of a screw pump, the "pick-up" angle (i. e. the inclination of the edges of the outlet guide vanes when these lie adjacent to the rotor) is, when fixed, correct only for one definite combination of head and quantity at any given speed of revolution of the rotor. This definite combination of head and quantity usually corresponds with the incidence of the maximum efficiency attainable at the given speed of revolution. To obtain maximum efficiencies for other combinations of quantity and head, with the given speed of revolution, the "pick-up" angle of the outlet guide vanes must be capable of alteration to suit each corresponding absolute direction of flow from the rotor. With outlet guide vanes having helical surfaces, as suitable for the conditions of flow imposed by a true screw rotor, any adjustment of these vanes about their longitudinal axes would result in their becoming "out of pitch". With guide vanes having a uniform angle of "pick-up", however, to conform with the flow conditions imposed by a constant whirl rotor, the vanes or the "pick-up" edges thereof, may be rotated about their longitudinal axes to accommodate a very considerable range of variation in the working conditions of the machine, with corresponding high efficiencies over a wide range. Such an arrangement is illustrated in Figures 19 and 20.

Figures 19, 20:
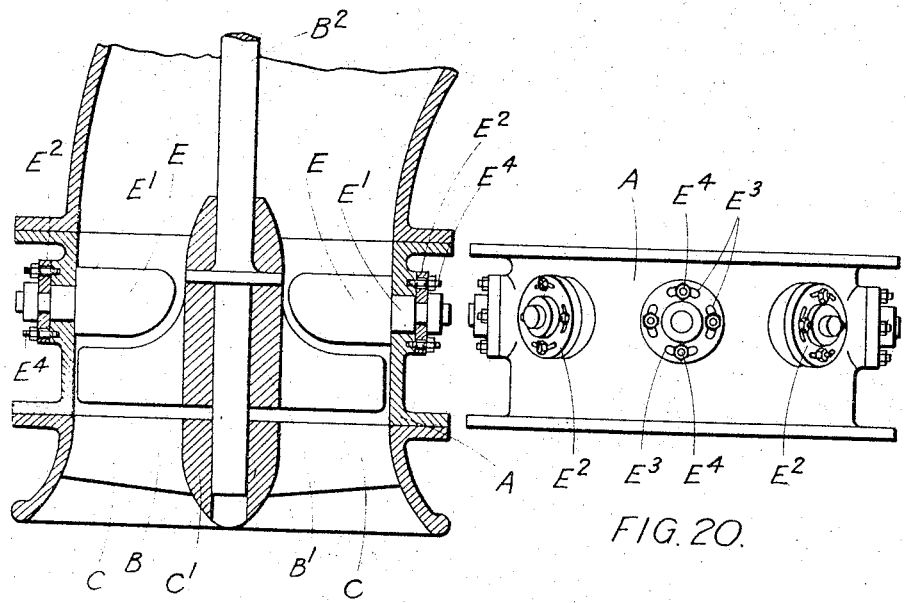
Figure 19 is a view similar to that of Figure 15 showing a modified form of pump employing adjustable outlet guide vanes.
Figure 20 is a side elevation of part of the casing of the pump shown in Figure 19.

In the construction shown in Figures 19 and 20. the rotor and the inlet guide vanes are arranged in a manner similar to that of the construction of Figures 15-18 (with the exception that the varying axial length of the rotor is accommodated by shaping its outlet surface, so that the inlet surface of the rotor and the outlet surface of the inlet guide vanes are plane) and will not be further described, the same reference letters being employed. The outlet guide vanes are, however, differently arranged and each individual outlet vane E is so mounted in the casing A as to be rotatable about a longitudinal axis. Thus each vane E has a cylindrical shank $E^1$ of large diameter passing through the casing A, and this shank $E^1$ carries outside the casing a disc $E^2$ having slots $E^3$ through which pass bolts $E^4$ engaging in tapped holes in the casing. Thus when the bolts $E^4$ are slacked off the disc $E^2$ and therefore also the vane E can be rotated through a small angle. The inner ends of the vanes E lie adjacent to the boss $B^1$ of the rotor which is in this instance extended through the guide vane space. It will be appreciated that the outlet guide vanes may be arranged in other ways so as to be rotatable about their longitudinal axes, and that means (such for example as those shown in Figures 22 and 23) may be provided for simultaneously rotating all the outlet vanes in circumstances where individual adjustment of the vanes is unsatisfactory.

Instead of mounting the outlet guide vanes adjacent to the rotor, it may sometimes be preferable to provide a clearance space between these elements. If then either the rotor or the set of outlet guide vanes be made movable in an axial direction, so as to vary the axial length of this clearance space, an effect may be obtained somewhat similar to that produced by rotating the vanes about their axes, for the conditions of flow in the fluid leaving the rotor will be those of a forced or compound vortex, and these conditions will tend to change in the clearance space into those of a free vortex. The absolute direction of flow of the fluid particles will thus vary at different axial distances from the rotor, and the axial length of the clearance space may be adjusted so that the pick-up angle of the outlet guide vanes most nearly coincides with the absolute direction of flow.

Figure 21:
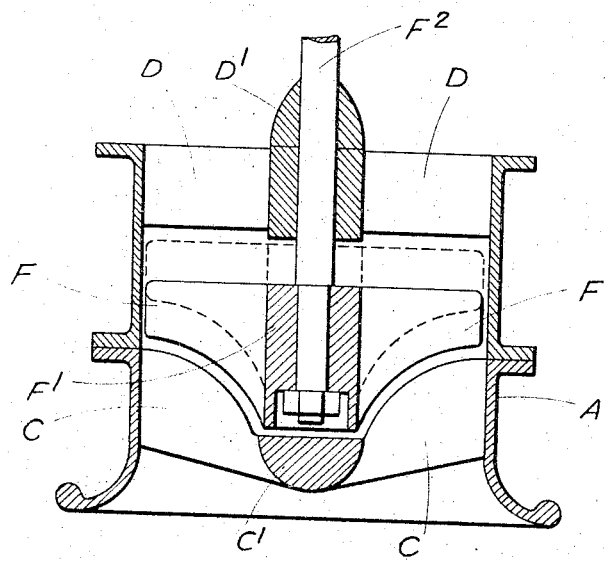
Figure 21 shows a further modification in which an axially movable rotor is employed.

Such an arrangement is illustrated in Figure 21, wherein the inlet and outlet guide vanes are arranged in the same manner as in the construction of Figures 15-18 (the same reference letters being employed) with the exception that there is a greater distance between them. The rotor, however, is in this instance so mounted that it can be moved axially within the space between the two sets of vanes from the position shown in full lines to that shown in dotted lines. The rotor is preferably again of the constant whirl type and comprises blades F carried by a boss $F^1$ mounted on the rotor shaft $F^2$, the construction of the rotor being identical with that already described wih reference to Figures 15-18.

The arrangement of Figure 21 is also of importance in the case when the rotor itself is not designed to give accurate constant whirl conditions or in the case when an approximation to constant whirl conditions is obtained with a true screw rotor by twisting the inlet guide vanes. In such cases the conditions of flow when the fluid leaves the rotor will be those of a compound vortex of some kind depending upon the law governing the pitch variations in the rotor or the extent of twisting of the inlet guide vanes. The gradual transition from this compound vortex to a free vortex will cause the relation between whirl and radius to vary at different axial distances from the rotor. The absolute direction of flow of the fluid particles will also change, and it will thus be possible to choose an axial length for the clearance space between the rotor and the outlet guide vanes so that these vanes may be of simple and convenient construction without any serious loss in efficiency.

The constructions of Figures 15-21 have been described with especial reference to employment as axial flow pumps. These constructions can, however, also be applied as axial flow turbines, although in such cases some modification will generally be desirable.

Taking first the simple arrangement of Figures 15-18, in which a rotor of the constant whirl type is mounted between two sets of fixed guide vanes, coaxial with and adjacent to the rotor, the inlet guide vanes for the turbine (which were the outlet guide vanes D for the pump) act to impart whirl to the fluid entering the rotor. The fluid operates on the blades B of the rotor and causes it to rotate, the whirl energy of the fluid being converted into torque energy in the rotor shaft $B^2$. If operating under conditions of ideal theoretical efficiency all the whirl would be abstracted from the fluid and converted into torque, and when the fluid leaves the rotor its absolute direction of flow would be axial. It will be seen that the outlet guide vanes (which were the inlet guide vanes C for the pump) would then become unnecessary and could be dispensed with. In cases where considerable whirl remains in the fluid discharged from the rotor, however, the provision of guide vanes at the outlet side may be desirable in order to reduce the possibility of the formation of an air core and to avoid retardation of the discharge by reason of spiral flow. These guide vanes, if placed adjacent to the rotor, would have their edges, which lie next to the rotor, curved slightly towards the direction of rotation of the rotor (instead of with the direction of rotation as in the case of the pump) in order to avoid eddy losses.

The considerations governing the inclination of the edges of the inlet guide vanes when adjacent to the rotor of a turbine, are exactly the same as those described with reference to outlet guide vanes for a pump. Thus when a constant whirl rotor is employed, the inlet guide vane edges should have a constant inclination from root to tip, in order to impart constant absolute direction of flow to the fluid entering the rotor. As in the pump, the actual inclination of these guide vanes will be theoretically correct only for one definite combination of head and quantity for each value of revolution speed of the rotor, and the alternative arrangement of Figures 19 and 20, in which the guide vanes E are rotatably mounted about their longitudinal axes is of considerable importance in a turbine, as will be clear without further description.

A certain amount of variation from constant whirl conditions in the designed distribution of pitch throughout the rotor is also permissible in a turbine, but the co-operation between rotor and adjacent guide vanes, with the object of approximating to constant whirl, as described with reference to the pump, is of little practical value in the turbine.

The arrangement of Figure 21, wherein a clearance space of constant or variable axial length is provided between the rotor and the outlet guide vanes of the pump, is of considerable importance in the application to a turbine. In such application, the provision of an adjustable clearance space permits of some considerable latitude in the shape of the inlet guide vanes (i. e. the pump outlet guide vanes) and in the distribution of pitch in the blades of the rotor, for by an adjustment of the clearance space and consequent modification in the control of the absolute direction of flow the effect of variations in design may be largely compensated.

This consideration leads up to an important alternative arrangement of hydraulic machines according to the invention. This arrangement, alternative forms of which are illustrated in Figures 22–24 and 33, is of especial importance in a turbine and will therefore be described with reference thereto, but it will be understood that it can also be employed with advantage, in certain instances, for an axial flow pump.

Figure 22:
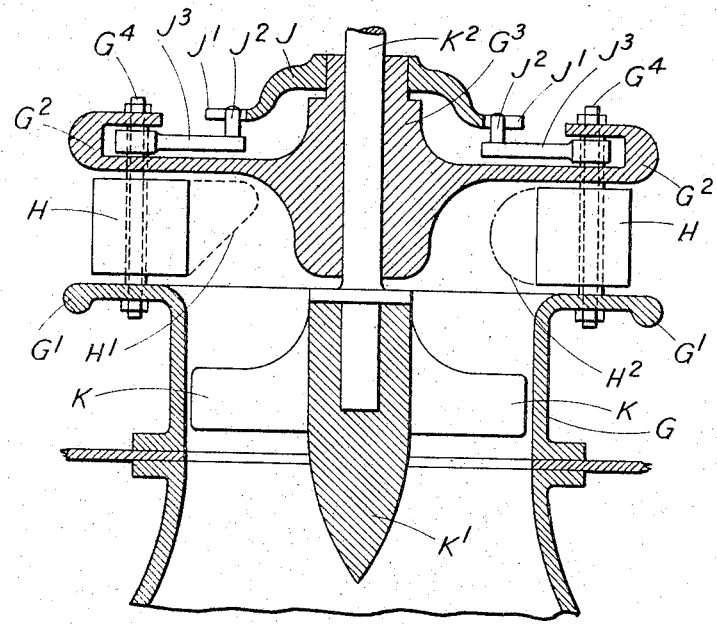
Figure 22 is an axial section through a turbine employing inlet guide vanes of the wicket type.

In the arrangement of Figure 22, the screw rotor, which is designed for constant whirl or approximately constant whirl conditions and comprises blades K carried by a boss $K^1$ mounted on the rotor shaft $K^2$, is mounted to rotate within a vertically arranged cylindrical downflow casing G. The inflow to the top of this downflow casing is horizontal and may take place either through a series of suitably disposed passages or through a continuous passage formed between a flange $G^1$ on the upper end of the casing G and a cover plate $G^2$ carried on a fixed boss $G^3$, through which the rotor shaft $K^2$ passes, the flange $G^1$ and the plate $G^2$ being connected together by bolts $G^4$. The horizontal inflow is controlled by a series of vertically pivoted vanes H of the balanced wicket type (such as are commonly employed with those hydraulic turbines whose inflow is inward and downward), the bolts $G^4$ conveniently being employed as the pivots of the vanes.

The number and size of the vanes H, which are grouped on a circle concentric with the axis of the rotor, is preferably such that when all the vanes have been rotated into their "broad-side-on" positions the inflow passage will be completely closed. It is also preferable to provide means for simultaneously rotating these vanes about their axes. One convenient arrangement is illustrated by way of example in Figure 22, wherein a spider J is rotatably mounted on the fixed boss $G^3$ and has slots $J^1$ within which can slide pins $J^2$ on the inner ends of arms $J^3$ carried by the vanes H. Thus when the spider J is rotated through a small angle either directly by hand or through suitable controlling mechanism, the vanes H will all rotate simultaneously and the angle of inflow of the fluid into the top of the downflow passage will be correspondingly altered. The guide vanes H instead of following the usual rectangular outline may, if desired, have sloping or curved edges, as indicated respectively in dotted lines at $H^1$ and $H^2$.

These guide vanes H act to impart a whirl to the fluid, which flows into the turbine under the action of the difference of level between the headrace and the tailrace of the machine. The conditions of whirl imposed initially by the guide vanes upon the inflowing fluid are those which obtain in a forced vortex, in which the whirl velocity is directly proportional to the radius. Downflow takes place, however, and the natural conditions imposed on whirling downflow are those of a free vortex, in which the whirl velocity is inversely proportional to the radius. There will thus be a gradual transition from forced to free vortex flow, and there will be an intermediate compound vortex condition which corresponds fairly closely with the desired constant whirl conditions, whilst over a fairly wide range the conditions will not differ materially from those of constant whirl.

If therefore the rotor be disposed in the downflow casing G at a position where this intermediate condition exists, the fluid will be supplied to the rotor under approximately constant whirl conditions. The distribution of pitch in the rotor blades K is preferably such as to conform accurately to the law governing the relation between whirl and radius at the chosen intermediate stage between forced and free vortex conditions. This relation can be made a fairly close approximation to constant whirl conditions, and in practice there will be comparatively little loss in efficiency if the rotor conforms accurately to such conditions.

In the construction of Figure 22 the rotor is fixed in position in the downflow casing G, but it will generally be preferable so to mount the rotor that its position is adjustable in an axial direction, in order to accommodate changes in the most efficient position, as caused by variations in head, quantity and the inclination of the inlet guide vanes. Such an arrangement is shown in Figure 23 which also serves to illustrate a modification in the arrangement of the inlet vanes.

Figure 23:
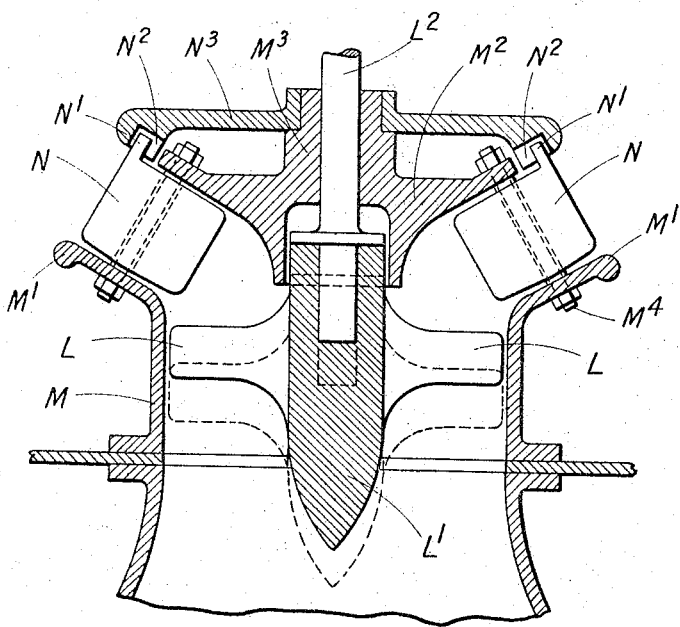
Figure 23 shows a modification of the turbine of Figure 22.

In the construction of Figure 23, the rotor comprises blades L mounted on a boss $L^1$ carried by the rotor shaft $L^2$ and is designed for constant whirl or approximately constant whirl conditions. The rotor rotates within a cylindrical downflow casing M and is so mounted as to be axially movable within the casing from the position indicated in full lines to that indicated in dotted lines. The inflow takes place through an inclined passage formed between a flange $M^1$ on the upper end of the casing M and a shaped cover plate $M^2$ carried on a fixed boss $M^3$ through which the rotor shaft $L^2$ passes, the cover plate $M^2$ being secured to the flange $M^1$ by means of bolts $M^4$. The inflow is controlled by vanes N of the balanced wicket type pivoted about the bolts $M^4$, which are so arranged that the axes of rotation of the vanes N lie on the surface of a cone coaxial with the rotor. The effect of this modification of the inlet vanes is to change the conditions of vortex flow in the fluid at the top of the inlet passage, and to enable an earlier and closer approximation to constant whirl conditions to be arrived at in the upper end of the downflow casing. It will be appreciated that the edges of the vanes may be shaped after the manner indicated at $H^1$ or $H^2$ in Figure 22, in order to modify the flow conditions at the top of the downflow passage. The inclination of the inflow passage and of the vane axes may vary to suit the requirements of particular instances, and the extreme cases will be that illustrated in Figure 22 where the inflow is horizontal and that in Figure 19 where the inflow is vertical.

The employment of inclined inlet vanes has the practical advantage of permitting the regulation of inflow and whirl (by rotating the vanes about their axes) to be accomplished in a convenient manner by means of a simple fitting of small diameter mounted concentrically with the axis of the rotor. In the example illustrated each vane N has a small projection $N^1$ near one edge, which engages in a slot $N^2$ in a disc $N^3$ rotatably mounted on the fixed boss $M^3$.

When either of the arrangements of Figures 22 and 23 is employed as a turbine, it will generally be unnecessary to provide outlet guide vanes, but if such vanes are employed they may be arranged either as fixed vanes or as vanes of the adjustable wicket type in an inclined or horizontal outflow passage. Alternatively they may be arranged coaxially with and adjacent to the rotor, in a manner similar to that described with reference to Figures 15–21. It will be appreciated that the arrangements of Figures 22 and 23 are also applicable as pumps, but when so applied the provision of guide vanes on the inlet side will generally be necessary.

The arrangement, in which adjustable balanced vanes are employed in convergent or divergent annular passages on both sides of the rotor, provides a convenient practical construction for a reversible tidal turbine or for a reversible pump, for the reason that both inflow and outflow conditions in either direction of flow are readily controllable by simple external means operating on the guide vanes. Two such arrangements are illustrated respectively in Figures 24 and 33, of which the former includes the features of Figure 22 while the latter involves the features of Figure 23. The arrangement of Figure 24 comprises a rotor O of the constant whirl type mounted on a shaft $O^1$ to rotate within a cylindrical casing P provided at its upper and lower ends with flanges $P^1$ $P^2$. Two sets of balanced wicket vanes Q and R are respectively mounted between these flanges $P^1$ $P^2$ and fixed end pieces $P^3$ $P^4$ and control the inflow and outflow to the casing P. The fixed parts are held together by means of bolts $P^5$ which are disposed alternately with the pivots about which the vanes Q R can be rotated. Thus the vanes Q of the lower set are carried on spindles $Q^1$ which pass up to the top of the machine, where they can be rotated for the purpose of adjusting the vanes Q by means of a simple fitting such for example as that shown in Figure 22. Similarly the vanes R are mounted on sleeves $R^1$ surrounding the spindles $Q^1$ and also controllable by means of a fitting at the top of the machine. The whole machine is preferably arranged symmetrically about a central horizontal plane, so that the conditions of flow when the flow is upward are similar to those when the flow is downward.

The arrangement of Figure 33 is in its upper half identical with that of Figure 23, and this portion will not be further described, the same reference letters being employed. The cylindrical downflow casing M is in this case provided with an inclined outflow passage W at its lower end, the outflow being controlled by vanes $W^1$ of the balanced wicket type pivoted about bolts $W^2$, whose axes lie on the surface of a cone coaxial with the rotor. The adjustment of the vanes $W^1$ is effected in the same manner as the adjustment of the inlet vanes N, by providing each vane with a small projection $W^3$ engaging in a slot $X^1$ in a projection $X^2$ from an annular member X rotatably mounted on the outside of the cylindrical casing M. Owing to the fact that the diameter of the casing M is relatively large, it is desirable to support the member X on slightly coned rollers $X^4$ engaging in a groove $X^3$ on the casing M. The manner of operation of this arrangement will at once be clear from the descriptions given with reference to Figures 23 and 24.

In the constructions shown in Figures 22-24 and 33, it may be desirable in some cases to employ fixed guide vanes in place of the balanced wicket vanes, and a similar effect can also be obtained by arranging the inlet (in the case of a turbine) or the outlet (in the case of a pump) in the form of a series of tangentially disposed passages or a single spiral passage with or without guide vanes. One such arrangement is illustrated in Figure 25, more especially intended for use as a pump but applicable also as a turbine.

In this arrangement a constant whirl rotor S on a shaft $S^1$ is mounted above and adjacent to fixed inlet guide vanes $S^2$ in a casing $S^3$ which terminates at its upper end in a volute discharge passage $S^4$, the shape of this passage being such as to render outlet guide vanes unnecessary.

In some instances (whether for pumps or for turbines) the conditions of working may require the employment of two or more rotors arranged in series on the same shaft instead of a single rotor. An arrangement with two rotors is shown by way of example in Figure 26. In this arrangement the two rotors T $T^1$ are both of the constant whirl type and are mounted on a shaft $T^2$ to rotate within a fixed casing $T^3$. Sets of guide vanes $T^4$ $T^5$ $T^6$ are mounted alternately with the rotors, the intermediate set $T^5$ thus acting simultaneously as the inlet vane set for one rotor and the outlet vane set for the other rotor. As shown in the drawings, the vanes $T^4$ $T^5$ $T^6$ are fixed within the casing $T^3$ adjacent to the rotors, but it will be appreciated that some of these vanes may be rotatable about longitudinal axes as in the construction of Figure 19 or again the terminal sets of vanes $T^4$ $T^6$ may be mounted at a distance from the rotors and may be of the balanced wicket type as described with reference to Figures 22-24.

In another arrangement (Figure 27), which may be of advantage in certain instances either for pumps or for turbines or for similar hydraulic machines of the axial flow type, two rotors U $U^1$ of the constant whirl type are mounted adjacent to one another on coaxial shafts $U^2$ $U^3$ which are connected together through gearing or in other ways so as to rotate in opposite directions, one of the rotors having right-handed blades whilst the blades of the other are left-handed. With this arrangement guide vanes $U^4$ may be employed on the pump inlet (or turbine outlet) side but it will generally be unnecessary to provide guide vanes on the pump outlet (or turbine inlet) side, for the second rotor $U^1$ will itself perform the functions of such guide vanes. Thus if the two rotors are substantially identical with one another (apart from the reversal of direction of the blades and any allowance for hydraulic losses) the whirl imparted by one rotor will be exactly taken out by the other rotor. If the two rotors have materially different pitch, the desired whirl compensation can still be obtained by so arranging the gearing between the two shafts as to give appropriate relative speeds of rotation. An advantage of this arrangement is that the second rotor will adequately perform the functions of the guide vanes under all conditions of flow. Another advantage is that larger power and head can be associated with a given diameter of rotor at a given revolution speed. It will be appreciated that, if the gearing between the two shafts is dispensed with, this arrangement may be employed as a hydraulic power transmission mechanism, one of the rotors, say U, connected to the driving shaft $U^2$ acting as a pump, whilst the other rotor $U^1$ connected to the driven shaft $U^3$ acts as a turbine.

In all the arrangements described the rotor may vary structurally in various ways, while conforming to the conditions of constant or approximately constant whirl. Figures 28-32 show various alternative forms of rotor by way of example, the arrows indicating the direction of rotation when used in a pump. Thus Figures 28 and 29 illustrate a rotor having two radial-edged blades V mounted between a cylindrical boss $V^1$ and a cylindrical shroud $V^2$. Figure 30 shows a similar shrouded rotor with three blades $V^3$ having "sickle-shaped" edges. Other shapes of shroud and boss (for example conical or curved as indicated for the shroud by the dotted lines $V^4$ $V^5$ respectively in Figure 29) may be employed as may be convenient. Figures 31 and 32 show two open rotors respectively having four and five blades $V^6$ and $V^7$ in one case with both blade edges tangentially arranged whilst in the other case the following edges are tangential and the leading edges are partially tangential and partially sickled. It will be appreciated that the arrangement of the blades may be modified in many ways, whilst the number of blades and the projected area on a transaxial plane may have such distribution and such ratio to the total disc area as may be best suited to the working conditions.

The projection of the blades on a plane containing the axis may have the blade edges straight, inclined, or curved and the direction of one edge having been determined, as most suitable to the working conditions, the depth of the blade and the outline of the other edge thereof will be determined by the pitch and the distribution of area projected on the transaxial plane.

Cylindrical sections of the blades taken at any radii may be of parallel thickness, lenticular, streamlined, or other suitable shape, according to the conditions of working, and the blade edges may be rounded.

The structural consideration for the rotor blades apply equally to the guide vanes.

Various forms of casing can be employed, as best adapted to the structural arrangements of turbines and pumps which comprise rotors designed for approximately uniform whirl conditions, and the axes of the machines may be vertical, horizontal or inclined, as best suited to the particular conditions of service.

The internal contours of the casings must be such as to avoid sudden changes in the general direction and velocity of fluid flow and to reduce frictional and eddy losses to a practical minimum.

Apart from the radial variation in pitch to produce a constant whirl effect or an approximation thereto, the blades of the rotor may be given axial variation in pitch, without interfering with the condition that the whirl velocity imparted to the fluid is approximately the same at all radii.

It will be appreciated that the various constructions and arrangements more particularly described have been given by way of example only and that modifications may be made without departing from the scope of the invention. Again, although the invention has been described more particularly with regard to its application to axial flow pumps and turbines, it is also applicable to other types of axial flow hydraulic machines, such for example as screw propellers, in which case the screw rotor may be employed either alone or in conjunction with guide vanes.

What I claim as my invention and desire to secure by Letters Patent is:—

1. In an axial flow hydraulic machine, a bladed rotor, the pitch of whose blades varies in a radial direction substantially in such a manner as to be proportional to $\frac{r}{r-c}$ where $r$ is the radius and $c$ is a constant.

2. An axial flow hydraulic machine comprising a bladed rotor, and guide vanes disposed adjacent to the rotor on one side thereof, the rotor blades and the guide vanes having such a radial distribution of pitch that the "head radius" lies between $$\frac{2}{3}R\frac{1-p^3}{1-p^2} + 0.075\,R(1-p)^2$$

and $$\frac{2}{3}R\frac{1-p^3}{1-p^2} - 0.075\,R(1-p)^2$$

where $R$ is the maximum radius of the rotor disc and $pR$ is the radius of the rotor boss.

3. An axial flow pump, comprising a casing, a bladed rotor rotatably mounted within the casing, a rotating shaft through which the rotor is driven, and a set of guide vanes fixed within the casing adjacent to the rotor on the inlet side thereof, the rotor blades and the inlet guide vanes having such a radial distribution of pitch that the "head radius" lies between $$\frac{2}{3}R\frac{1-p^3}{1-p^2} + 0.075\,R(1-p)^2$$

and $$\frac{2}{3}R\frac{1-p^3}{1-p^2} - 0.075\,R(1-p)^2$$

where $R$ is the maximum radius of the rotor disc and $pR$ is the radius of the rotor boss.

4. An axial flow pump including in combination a fixed casing, a bladed rotor disposed coaxially within the casing, and a set of guide vanes mounted in the casing on the inlet side of the rotor, the rotor blades having such a radial distribution of pitch that the "head radius" lies between $$\frac{2}{3}R\frac{1-p^3}{1-p^2} + 0.075\,R(1-p)^2$$

and $$\frac{2}{3}R\frac{1-p^3}{1-p^2} - 0.075\,R(1-p)^2$$

where $R$ is the maximum radius of the rotor disc and $pR$ is the radius of the rotor boss 5. An axial flow hydraulic machine, comprising a bladed rotor, and two sets of guide vanes mounted respectively on the two sides of the rotor, the rotor blades and the guide vanes having such a radial distribution of pitch that the "head radius" lies between $$\frac{2}{3}R\frac{1-p^3}{1-p^2} + 0.075\,R(1-p)^2$$

and $$\frac{2}{3}R\frac{1-p^3}{1-p^2} - 0.075\,R(1-p)^2$$

where $R$ is the maximum radius of the rotor disc and $pR$ is the radius of the rotor boss.

6. An axial flow hydraulic machine, including in combination a bladed rotor, and a set of guide vanes disposed on one side thereof, namely, the outlet side when the machine is acting as a pump, the pitch of the rotor blades varying in a radial direction substantially in such a manner as to be proportional to $\frac{r}{r-c}$ where $r$ is the radius and $c$ is a constant.

7. An axial flow hydraulic machine, comprising a casing, a bladed rotor the pitch of whose blades varies in a radial direction in such a manner that the "head radius" lies between $$\frac{2}{3}R\frac{1-p^3}{1-p^2}+0.075\ R(1-p)^2$$

and $$\frac{2}{3}R\frac{1-p^3}{1-p^2}-0.075\ R(1-p)^2$$

where R is the maximum radius of the rotor disc and $p$R is the radius of the rotor boss and two sets of guide vanes mounted in the casing respectively on the two sides of the rotor.

8. An axial flow pump, comprising a casing, a bladed rotor rotatably mounted within the casing, a rotating shaft through which the rotor is driven, and two sets of guide vanes mounted within the casing respectively on the inlet and outlet sides of the rotor and disposed adjacent to and coaxial with the rotor, the pitch of the rotor blades varying in a radial direction substantially in such a manner as to be proportional to $\frac{r}{r-c}$ where $r$ is the radius and $c$ is a constant.

9. An axial flow hydraulic machine, including in combination a bladed rotor the pitch of whose blades varies in a radial direction substantially in such a manner as to be proportional to $\frac{r}{r-c}$ where $r$ is the radius and $c$ is a constant, and a set of guide vanes disposed adjacent to the rotor on one side thereof, namely, the outlet side when the machine is acting as a pump, the inclination of the edges of such guide vanes lying next to the rotor being constant from root to tip.

10. An axial flow pump, including in combination a bladed rotor, and guide vanes disposed adjacent to the rotor on the inlet side thereof, the rotor blades and the inlet guide vanes having such a radial distribution of pitch that the pitch of the rotor blades at radius $r$ is proportional to $\frac{ry}{r-cy}$ where $c$ is a constant and $y$ is the axial flow velocity at radius $r$ at inlet to the rotor dependent upon the shape of the inlet guide vanes.

11. An axial flow pump, comprising a casing, a bladed rotor rotatably mounted within the casing, a rotating shaft through which the rotor is driven, and two sets of guide vanes mounted within the casing respectively on the inlet and outlet sides of the rotor and disposed adjacent to and coaxial with the rotor, the inclination of the edges of the outlet guide vanes lying next to the rotor being constant from root to tip whilst the rotor blades and the inlet guide vanes have such a radial distribution of pitch that the pitch of the rotor blades at radius $r$ is proportional to $\frac{ry}{r-c}$ where $c$ is a constant and $y$ is the axial flow velocity at radius $r$ at inlet to the rotor dependent upon the shape of the inlet guide vanes.

12. An axial flow hydraulic machine, including in combination a bladed rotor the pitch of whose blades varies in a radial direction in such a manner that the "head radius" lies between $$\frac{2}{3}R\frac{1-p^3}{1-p^2}+0.075\ R(1-p)^2$$

and $$\frac{2}{3}R\frac{1-p^3}{1-p^2}-0.075\ R(1-p)^2$$

where R is the maximum radius of the rotor disc and $p$R is the radius of the rotor boss, a set of guide vanes disposed on one side of the rotor, namely the outlet side when the machine is acting as a pump, each of such guide vanes being rotatable about its longitudinal axis, and means for rotating the guide vanes about their axes.

13. An axial flow hydraulic machine, comprising a fixed casing, a bladed rotor rotatably disposed within the casing, a rotating shaft on which the rotor is mounted, a set of guide vanes disposed within the casing on one side of the rotor, namely, the inlet side when the machine is acting as a pump, a second set of guide vanes disposed coaxial with and adjacent to the rotor on the other side thereof, each of the guide vanes of the second set being rotatable about its longitudinal axis, and means for rotating such guide vanes about their axes, the pitch of the rotor blades varying in a radial direction substantially in such a manner as to be proportional to $\frac{r}{r-c}$ where $r$ is the radius and $c$ is a constant.

14. An axial flow pump, comprising a cylindrical casing, a rotor centrally disposed within the casing and having blades whose pitch varies in a radial direction substantially in such a manner as to be proportional to $\frac{r}{r-c}$ where $r$ is the radius and $c$ is a constant, a rotating shaft through which the rotor is driven, a set of inlet guide vanes fixed within the casing coaxial with and adjacent to the rotor, a set of outlet guide vanes disposed coaxial with and adjacent to the rotor, the inclination of the edges of the outlet guide vanes lying next to the rotor being constant from root to tip, and means for rotating each outlet guide vane about its longitudinal axis.

15. An axial flow hydraulic machine, having a plurality of bladed elements, one of which is rotatably mounted to constitute a rotor, the blades of such elements having such a radial distribution of pitch that the head radius lies between $$\frac{2}{3} R \frac{1-p^3}{1-p^2} + 0.075\ R(1-p)^2$$

and $$\frac{2}{3} R \frac{1-p^3}{1-p^2} - 0.075\ R(1-p)^2$$

where R is the maximum radius of the rotor disc and $pR$ is the radius of the rotor boss.

16. In an axial flow hydraulic machine, a bladed rotor, the pitch of whose blades varies in a radial direction in such a manner that the head radius lies between $$\frac{2}{3} R \frac{1-p^3}{1-p^2} + 0.075\ R(1-p)^2$$

and $$\frac{2}{3} R \frac{1-p^3}{1-p^2} - 0.075\ R(1-p)^2$$

where R is the maximum radius of the rotor disc and $pR$ is the radius of the rotor boss.

In testimony whereof I have signed my name to this specification.

JAMES HERBERT WAINWRIGHT GILL.